(12) United States Patent
Ogata (10) Patent No.: US 11,927,122 B2
(45) Date of Patent: Mar. 12, 2024

(54) EXHAUST PROMOTION DEVICE, AND EXHAUST SYSTEM IMPROVEMENT METHOD FOR INTERNAL COMBUSTION ENGINE

(71) Applicant: KOKUSHO CO., LTD., Tokyo (JP)

(72) Inventor: Kazuo Ogata, Tokyo (JP)

(73) Assignee: Kokusho Co., Ltd., Tokyo (JP)

( * ) Notice: Subject to any disclaimer, the term of this patent is extended or adjusted under 35 U.S.C. 154(b) by 0 days.

(21) Appl. No.: 17/907,476

(22) PCT Filed: Jan. 21, 2021

(86) PCT No.: PCT/JP2021/002022
§ 371 (c)(1),
(2) Date: Sep. 27, 2022

(87) PCT Pub. No.: WO2021/255973
PCT Pub. Date: Dec. 23, 2021

(65) Prior Publication Data
US 2023/0124376 A1    Apr. 20, 2023

(30) Foreign Application Priority Data

Jun. 17, 2020   (JP) ................................ 2020-104481
Jun. 29, 2020   (JP) ................................ 2020-112084
Dec. 28, 2020   (JP) ................................ 2020-219537

(51) Int. Cl.
*F01N 13/08*       (2010.01)
*F01N 3/28*        (2006.01)
(Continued)

(52) U.S. Cl.
CPC ......... *F01N 13/082* (2013.01); *F01N 3/2892* (2013.01); *F01N 3/055* (2013.01); *F01N 3/20* (2013.01); *F01N 2260/022* (2013.01)

(58) Field of Classification Search
CPC . F01N 13/082; F01N 2270/08; F01N 2470/30
See application file for complete search history.

(56) References Cited

U.S. PATENT DOCUMENTS 2,248,456 A  *  7/1941  Harris ...................... F01N 1/02
                                                    181/262
5,280,143 A     1/1994  Kakuta
                       (Continued)

FOREIGN PATENT DOCUMENTS

JP        2-125906        5/1990
JP        5-340243       12/1993
                       (Continued)

OTHER PUBLICATIONS

Machine translation of JP H10-110612 A, accessed Sep. 8, 2023. (Year: 2023).*

(Continued)

*Primary Examiner* — Jonathan R Matthias
(74) *Attorney, Agent, or Firm* — Hamre, Schumann, Mueller & Larson, P. C.

(57) ABSTRACT

A problem to be solved is to provide an exhaust promotion method, an exhaust promotion device, and an exhaust system improvement method for an internal combustion engine capable of further improving the exhaust efficiency by high-speed exhaust of exhaust gas.

What is characteristic is that an exhaust gas discharged from the internal combustion engine is expanded in multiple stages repeatedly to reduce a temperature thereof, and thus exhaustion is performed while suppressing a behavior derived from a thermal energy of the exhaust gas.

16 Claims, 4 Drawing Sheets

(51) Int. Cl.
*F01N 3/05* (2006.01)
*F01N 3/20* (2006.01)

(56) References Cited

U.S. PATENT DOCUMENTS

| | | | | |
|---|---|---|---|---|
| 9,920,670 | B1* | 3/2018 | Wright | F01N 1/083 |
| 2006/0070359 | A1 | 4/2006 | Sellers et al. | |
| 2007/0163247 | A1* | 7/2007 | Ryan | F01N 13/082 |
| | | | | 60/288 |
| 2011/0011060 | A1* | 1/2011 | McCarthy, Jr. | F01N 3/2033 |
| | | | | 60/274 |

FOREIGN PATENT DOCUMENTS

| | | |
|---|---|---|
| JP | 6-10659 | 1/1994 |
| JP | 6-173634 | 6/1994 |
| JP | 6-185338 | 7/1994 |
| JP | 3021165 U | 2/1996 |
| JP | 10-110612 | 4/1998 |
| JP | 10-331631 | 12/1998 |
| JP | 2002-285820 | 10/2002 |
| JP | 2011-074774 | 4/2011 |
| JP | 3186232 U | 9/2013 |
| JP | 2015-014293 | 1/2015 |
| JP | 2017-227173 | 12/2017 |
| JP | 2018-013067 | 1/2018 |
| JP | 2018-168718 | 11/2018 |
| JP | 2019-074051 | 5/2019 |
| JP | 2019203438 A * | 11/2019 |
| KR | 20140035922 A * | 3/2014 |

OTHER PUBLICATIONS

Machine translation of JP 2011-074774 A, accessed Sep. 8, 2023. (Year: 2023).*

International Search Report issued in International Application No. PCT/JP2021/002022, dated Mar. 30, 2021, 7 pages w/ translation.

* cited by examiner

//EXHAUST PROMOTION DEVICE, AND EXHAUST SYSTEM IMPROVEMENT METHOD FOR INTERNAL COMBUSTION ENGINE

TECHNICAL FIELD

The present invention relates to an exhaust promotion method, an exhaust promotion device, and an exhaust system improvement method for improving the exhaust efficiency of exhaust gas discharged from an internal combustion engine.

BACKGROUND ART

Exhaust gas from internal combustion engines contains harmful substances such as particulate matter (PM), hydrocarbon (HC), oxides of nitrogen (NOx), sulfur dioxide (SO2), and carbon monoxide (CO).

In order to remove these harmful substances, a purification device having a catalytic structure has come to be installed in the middle of the exhaust system of the internal combustion engine.

The purification device installed in the middle of the exhaust system of the internal combustion engine acts as a resistance for the exhaust flow in the exhaust system and affects the output characteristics of the internal combustion engine.

Therefore, there is a demand for the development of a technique for improving the exhaust efficiency in the exhaust system of the internal combustion engine, and the technique is proposed in, for example, Patent Literature 1. Patent Literature 1 describes an exhaust gas flow promotion device installed in a terminal of an exhaust system of an internal combustion engine and including an accelerating cylinder having a tapered shape widened toward the upstream side of the exhaust gas, a cover cylinder having a tubular shape coaxially surrounding the outside of the accelerating cylinder, and a diversion hole opened in the acceleration cylinder.

The exhaust gas flow promotion device according to Patent Literature 1 accelerates and divides the exhaust gas in the accelerating cylinder and generates a negative pressure around a central flow discharged at high speed from the accelerating cylinder, and the negative pressure accelerates the surrounding flow in the cover cylinder to exhaust, to improve the exhaust efficiency.

To be noted, the technique for accelerating the exhaust gas flow in this way is also described in Patent Literatures 2 to 5.

CITATION LIST

Patent Literature

Patent Literature 1: JP 10-331631 A
Patent Literature 2: JP 2011-74774 A
Patent Literature 3: Japanese Utility Model Registration No. 3186232
Patent Literature 4: JP 02-125906 A
Patent Literature 5: JP 06-173634 A

SUMMARY OF INVENTION

Technical Problem

A problem to be solved by the present invention is to provide an exhaust promotion method, an exhaust promotion device, and an exhaust system improvement method for an internal combustion engine capable of further improving the exhaust efficiency by high-speed exhaust of exhaust gas.

Solution to Problem

The exhaust promotion method for an internal combustion engine is characterized by expanding an exhaust gas discharged from the internal combustion engine in multiple stages repeatedly to reduce a temperature thereof, and thus performing exhaustion while suppressing a behavior derived from a thermal energy of the exhaust gas.

According to such an exhaust promotion method, the temperature of the exhaust gas is reduced in a multi-step expansion process, and the thermal energy of the exhaust gas is deprived by this temperature reduction, and the behavior derived from the thermal energy is suppressed.

Control of the flow direction of the exhaust gas whose behavior is suppressed in this way becomes easy, and the flow of the exhaust gas can be made to follow the main exhaust direction.

As a result, the flow of the exhaust gas can be smoothed and the exhaust efficiency can be improved.

The exhaust promotion device for an internal combustion engine of the present invention is configured as follows in order to solve the problems described above.

Provided are a casing provided at an exhaust end portion of an exhaust system of an internal combustion engine, an exhaust flow control cylinder concentrically provided in the casing so as to form an annular space portion between the exhaust flow control cylinder and the inner surface of the casing, and a cooling cylinder coaxial with the casing and provided to an end portion of the casing on the exhaust downstream side at an interval with respect to the exhaust flow control cylinder in an exhaust direction. The exhaust flow control cylinder has a first expansion portion having an approximate truncated cone cross section that gradually expands in diameter toward the downstream side of the exhaust flow, and an acceleration portion continuously provided with the first expansion portion and having an approximate truncated cone cross section that gradually contracts in diameter toward the downstream side of the exhaust. In addition, diversion holes through which the acceleration portion and the space portion communicate is provided in a connecting portion of the acceleration portion to the first expansion portion. The space portion is formed as a second expansion portion whose capacity gradually increases toward the downstream side of the exhaust, and has a throttle facing an end portion of the acceleration portion on the downstream side of the exhaust. The capacity of the space portion is set to be larger than the capacity of the acceleration portion.

According to such a configuration, the exhaust gas that has flowed into the exhaust promotion device expands in the first expansion portion in the exhaust flow control cylinder, a part thereof becomes a central flow toward the acceleration portion, and the remainder is divided into the second expansion portion through the diversion holes to become the outer peripheral flow.

The outer peripheral flow expands in the second expansion portion and then flows toward the throttle on the downstream side, and the central flow is accelerated in the acceleration portion and then jetted toward the center of the throttle.

Here, a negative pressure region is formed around the throttle by the central flow jetted from the acceleration portion to the throttle, and the outer peripheral flow in the second expansion portion is sucked by this negative pressure to flow into the cooling cylinder together with the central flow.

In this way, the exhaust gas is discharged while being accelerated, is thus suppressed from becoming an exhaust resistance, and thereby the exhaust efficiency is improved.

Further, the outer peripheral flow continuously expands in the first expansion portion and the second expansion portion, and the temperature of the outer peripheral flow is reduced due to these expansions.

Then, the outer peripheral flow is further cooled by the outside air in the cooling cylinder, and thus the temperature is reduced.

Since the capacity of the space portion that becomes the second expansion portion is set to be larger than the capacity of the acceleration portion, the temperature drop phenomenon due to the expansion of the exhaust gas that becomes the outer peripheral flow can be enhanced by that amount.

Due to such a decrease in the temperature of the outer peripheral flow, thermal energy is derived from the outer peripheral flow, thus the flow thereof becomes smooth, the exhaust efficiency is further improved in combination with the speeding up of the exhaust, and the exhaust promotion method of the present invention can be performed effectively.

Here, the capacity of the space portion is preferably set to 1.8 times or more, more preferably 1.9 times or more, and particularly preferably 2.0 times or more, and preferably 2.6 times or less, more preferably 2.5 times or less, and particularly preferably 2.3 times or less of the capacity of the acceleration portion. Although the exhaust promotion effect can be also expected at 1.8 times or less, but it may be insufficient. In addition, if it is larger than 2.6 times, the casing itself may become too large.

It is preferable that the cooling cylinder includes an inner cylinder connected to the throttle and an outer cylinder forming an annular ventilation space portion between the inner cylinder and the outer cylinder, and the outer cylinder has a vent for introducing outside air into the ventilation space portion.

In the case of such a configuration, in the cooling cylinder, outside air flows into the ventilation space portion as the vehicle travels, and this outside air flows in contact with the inner surface of the outer cylinder and the outer surface of the inner cylinder.

Here, the flow of the outside air in the ventilation space portion is discharged while being sucked by the exhaust gas jetted from the end portion of the inner cylinder, so that the amount of ventilation increases accordingly. As a result, an effect of further enhancing the cooling effect of the exhaust gas flowing in the inner cylinder is exerted.

In the present invention, it is preferable to form multiple spiral grooves in the inner wall of the exhaust flow control cylinder.

According to such a configuration, the central flow can be made a swirling flow to improve the straightness thereof, and the negative pressure generated in the throttle can be increased to enhance the sucking effect of the negative pressure for the outer peripheral flow and assist the increase in the flow rate of the exhaust gas.

In the present invention, it is preferable to form multiple spiral grooves in the inner wall of the inner cylinder.

According to such a configuration, the exhaust gas that has become a spiral flow discharged from the discharge port of the acceleration portion can be further made into a spiral flow by the spiral grooves of the inner cylinder, and thus the flow can be further smoothed to improve the exhaust efficiency. Further, the contact area with the inner cylinder can be increased to enhance the cooling effect for the exhaust gas by the inner cylinder.

It is preferable that at least one of the casing and the exhaust flow control cylinder is formed from a ceramic material.

According to such a configuration, it is possible to purify the exhaust gas by utilizing the catalytic function of the ceramic material.

It is preferable to form a plurality of recess portions in the inner wall of the casing.

As described above, by forming a plurality of recess portions in the inner wall of the casing, the silencing effect can be exhibited by the action of these recess portions.

Further, in the present invention, by accelerating the exhaust flow in the central portion in this way, the temperature can be lowered to reduce NOx, and in the outer peripheral portion, the exhaust flow can be slowed to raise the temperature to reduce the PM of the exhaust gas. As a result, both NOx and PM can be reduced.

Furthermore, since the exhaust flow is accelerated to high speed and discharged, and the exhaust gas in the exhaust system is strongly sucked by using the negative pressure generated near the throttle, sufficient air is supplied to the combustion chamber of the internal combustion engine, and moreover, the exhaust gas in the combustion chamber is also sufficiently scavenged. As a result, the inside of the combustion chamber is maintained in a complete combustion state or a combustion state close to complete combustion. As a result, in addition to the remarkable reduction effect for $CO_2$ in the exhaust gas, a remarkable reduction effect can be also obtained for other harmful substances.

Further, by further enhancing the exhaust efficiency in this way, the internal combustion engine can obtain a complete combustion state or a combustion state close to complete combustion, thereby preventing the internal combustion engine and the exhaust promotion device from becoming hot. As a result, even immediately after the operation of the internal combustion engine, the temperature of both the internal combustion engine and the exhaust promotion device can be lowered enough to be firmly touched with bare hands. That is, the exhaust promotion device can even provide a self-cooling function to the internal combustion engine and the exhaust system.

The present invention is a method for improving an exhaust system of an internal combustion engine equipped with the exhaust system that purifies an exhaust gas with a catalyst device, and is characterized by including a step of providing an exhaust promotion device at an exhaust end portion of the exhaust system, an engine driving step of driving the internal combustion engine, wherein in the engine driving step, the exhaust system including the catalyst device is cleaned by driving the internal combustion engine for a required time.

In this way, by providing the exhaust promotion device at the exhaust end portion of the exhaust system and driving the internal combustion engine, the exhaust promotion device exerts a strong exhaust promotion effect, and thus the exhaust system including the catalyst device can be cleaned. That is, when the operation of the internal combustion engine is continued, carbon and other harmful substances contained in the exhaust gas gradually attach to the exhaust system and the catalyst device, but by providing the exhaust promotion device of the present invention is provided at a predetermined position to promote exhaustion, an effect of removing the attached carbon and other harmful substances is exerted effectively.

Further, after the exhaust system including the catalyst device is cleaned sufficiently, it is possible to suppress the attachment of carbon and other harmful substances to the exhaust system including the catalyst device. This is because by the strong suction effect using the negative pressure of the exhaust promotion device, exhaust gas that is nearly completely combusted is discharged from the combustion chamber of the internal combustion engine and flows through the exhaust system and the catalyst device. Therefore, the cleaning effect of the exhaust system including the catalyst device can be maintained for a long period of time or until the internal combustion engine is no longer used.

In the engine driving step, it is preferable to drive the internal combustion engine for 1 hour or more. Although it depends on the amount of carbon and other harmful substances attached to the exhaust system including the catalyst device, the engine driving step is preferably longer, more preferably 3 hours or more, and particularly preferably 5 hours or more. Although the cleaning function is exhibited even if the driving time of the internal combustion engine is shorter than 1 hour, the cleaning function becomes remarkable at or after 1 hour.

In the engine driving step, it is preferable to use an in-use vehicle equipped with the internal combustion engine including the exhaust system including the catalyst device. This is because in the case of an in-use vehicle, the amount of carbon and other harmful substances attached to the exhaust system including the catalyst device is large. In such an in-use vehicle, it is preferable to perform the engine driving step for 5 hours or more. By doing so, it becomes possible to greatly reduce the amount of attached carbon and other harmful substances. This makes it possible to return the amount of attached carbon and other harmful substances to a state close to that of a new car.

It is preferable that the engine driving step includes a step of traveling or virtually travelling an in-use vehicle.

As described above, in the engine driving step of the in-use vehicle, it is preferable that the vehicle is actually driven or virtually driven on a rotating roller. This is because a more concrete, a more practical, more efficient, and more economical exhaust system improvement method can be achieved by using a traveling mode in which a load is actually applied to the rotation of the wheels, that is, in which a load is applied to the internal combustion engine, than by using a mode in which the engine is driven but the vehicle is not driven.

The engine driving step is preferably performed until the travel distance by the driving of the internal combustion engine becomes 100 km or more.

Here, the travel distance by the driving of the internal combustion engine is set to 100 km or more in consideration of the in-use vehicle. This is because, in the case of an in-use vehicle, although it depends on the number of years of use and the travel distance so far, the test results are generally significantly improved at a travel distance of 100 km or more. Of course, the cleaning function can be expected even at 100 km or less, but it cannot be said that the function is fully exhibited. It has been confirmed that, as the travel distance reaches 200 km, 300 km, and 400 km, the cleaning action gradually progresses, and in an in-use vehicle of long-term use, the cleaning action is still progressing when the distance exceeds 500 km.

In the method for improving the exhaust system of the internal combustion engine according to the present invention, it is preferable to use the exhaust promotion device according to any one of claims 2 to 8 as the exhaust promotion device.

In addition, the method for improving the exhaust system of the internal combustion engine according to the present invention is characterized by including providing the exhaust system with a self-cleaning function by providing the exhaust system of the internal combustion engine with the exhaust promotion device according to any one of claims 2 to 8.

According to the present invention, it is possible to impart a self-cleaning function to the exhaust system simply by providing the exhaust promotion device according to any one of claims 2 to 8 in the exhaust system of the internal combustion engine in this way.

The present invention is characterized by including an automobile equipped with the internal combustion engine including the exhaust promotion device according to any one of claims 2 to 8.

Advantageous Effects of Invention

According to the present invention, there is a synergistic effect between improvement of the exhaust efficiency by accelerating exhaustion and improvement of the exhaust efficiency by cooling the exhaust gas and depriving thermal energy and thus smoothing the flow of the exhaust gas, and thus the exhaust efficiency can be further improved.

Further, according to the present invention, by providing the exhaust promotion device at the exhaust end portion of the exhaust system and driving the internal combustion engine, the exhaust promotion device exerts a strong exhaust promotion effect, and thus the exhaust system including the catalyst device can be effectively cleaned.

DESCRIPTION OF EMBODIMENTS

First Embodiment

Hereinafter, a first embodiment of the present invention will be described with reference to drawings.

First, prior to the description of the exhaust promotion method of the present invention, an exhaust promotion device capable of effectively implementing this exhaust promotion method will be described.

Figure 1:
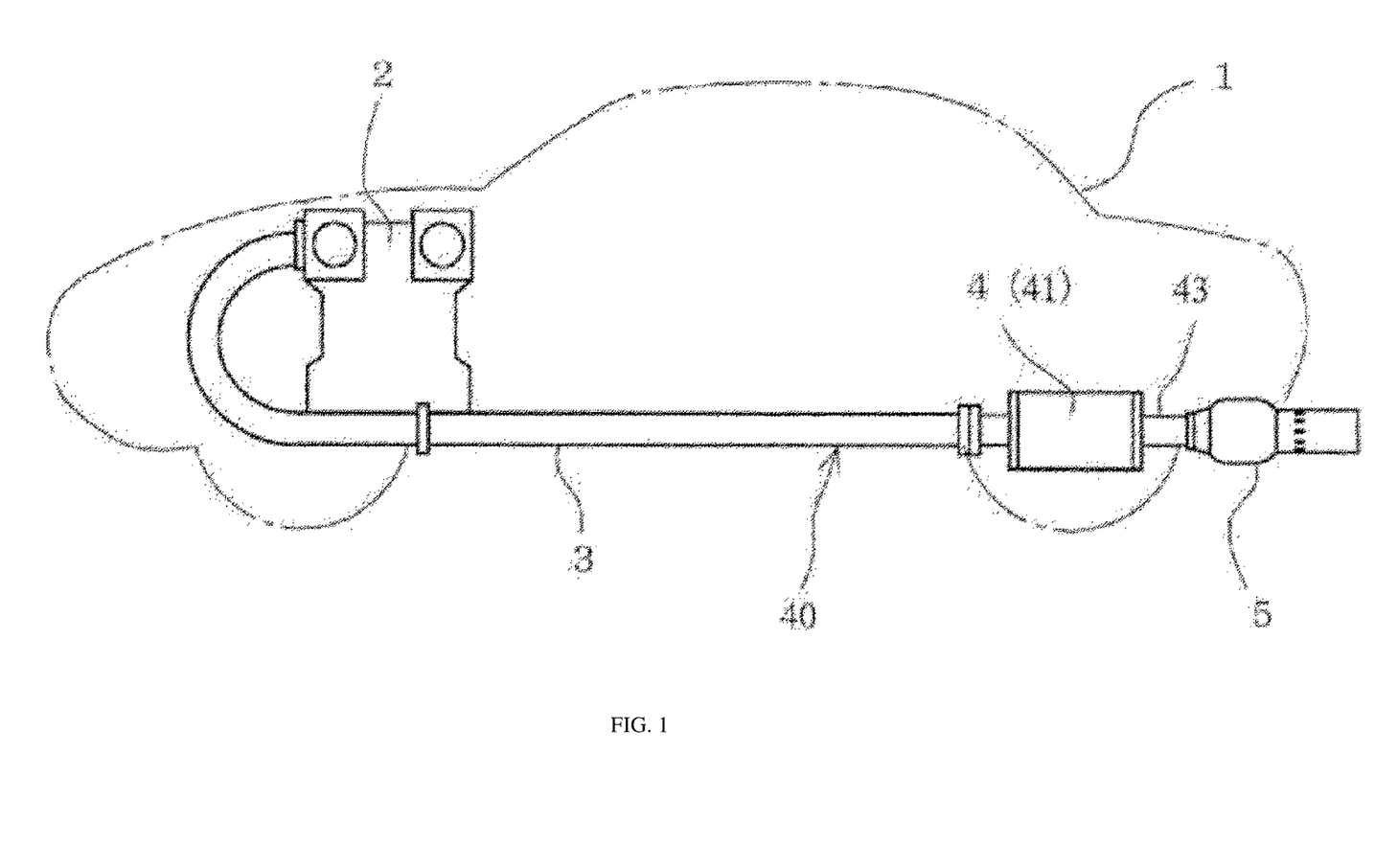
FIG. 1 is a schematic view of a vehicle to which an embodiment of the present invention is applied.

In these diagrams, reference numeral 1 indicates a vehicle to which the present embodiment is applied. The vehicle 1 includes an internal combustion engine 2, an exhaust pipe 3, and a silencer 4, and an exhaust promotion device 5 of the present embodiment is attached to an exhaust end portion 43 of the silencer 4. To be noted, the silencer 4 may have a structure including a catalyst device 41 or a structure not including the catalyst device 41. This catalyst device 41 may be provided separately from the silencer 4. Further, the silencer 4 may be omitted, and the exhaust promotion device 5 may be directly connected to the exhaust pipe 3.

Figure 2:
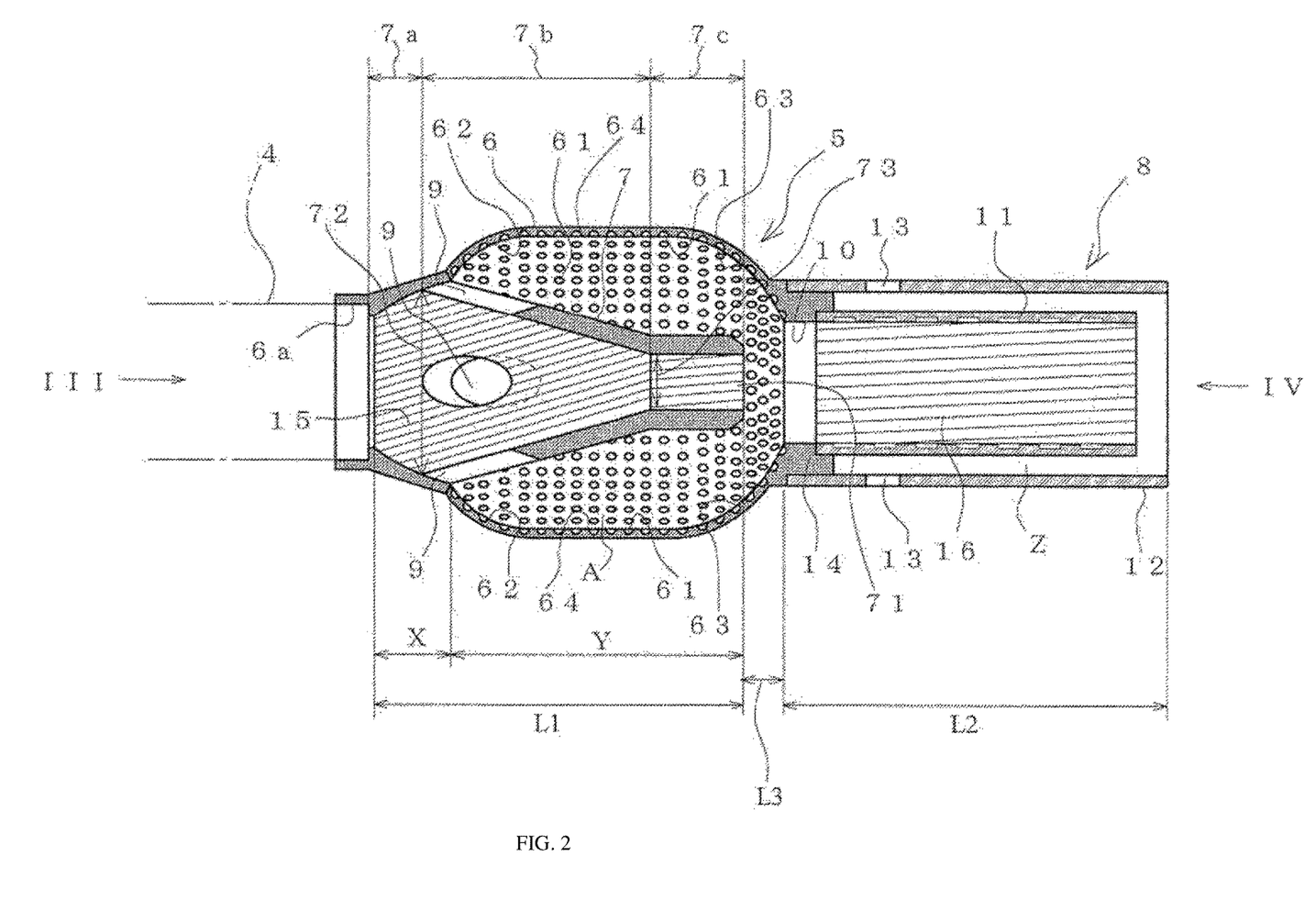
FIG. 2 is a longitudinal section view of an embodiment of the present invention.
Figure 3:
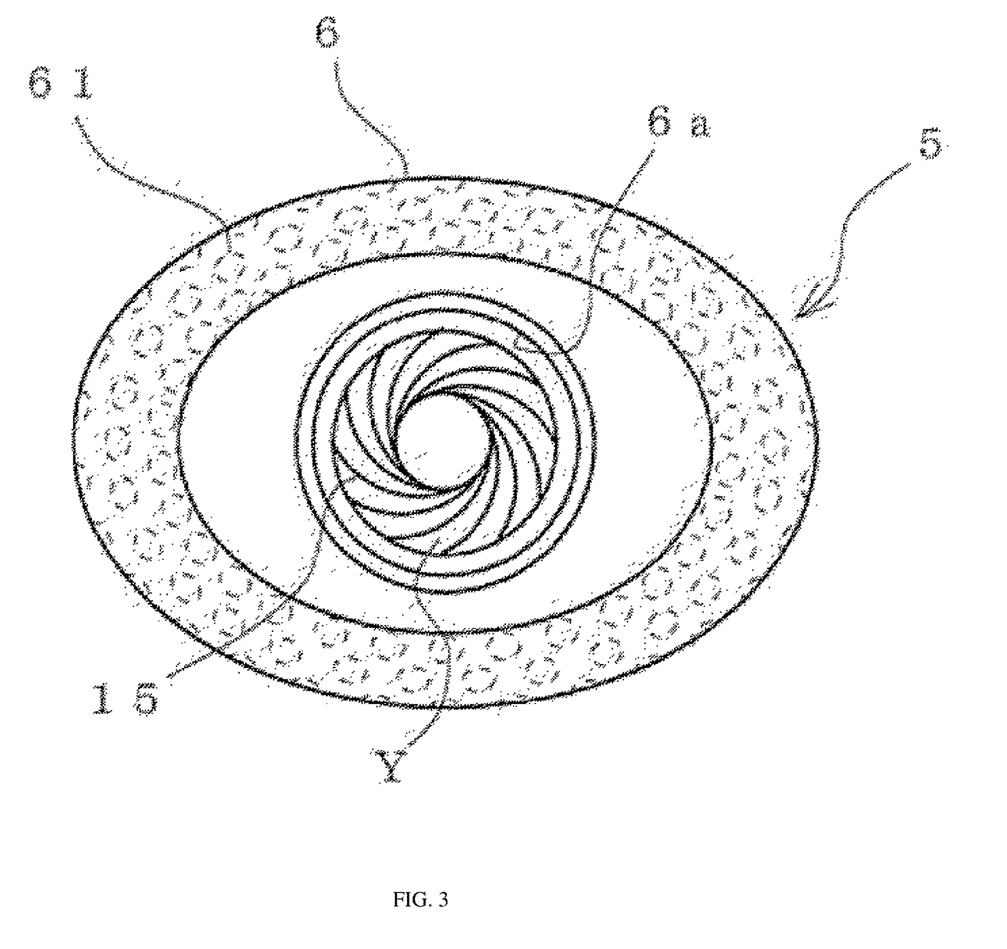
FIG. 3 is a diagram illustrating a view from the direction of an arrow III in FIG. 2.
Figure 4:
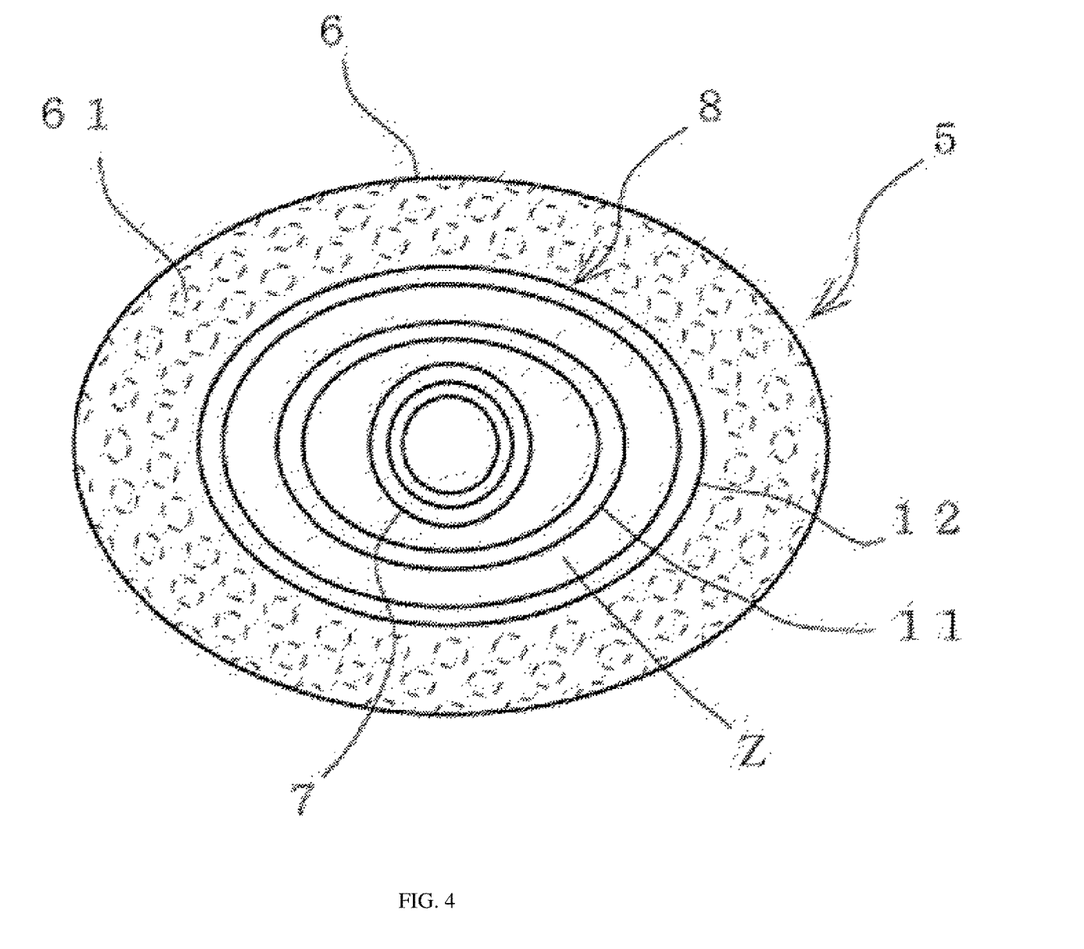
FIG. 4 is a diagram illustrating a view from the direction of an arrow IV in FIG. 2.

As illustrated in FIG. 2, the exhaust promotion device 5 of the present embodiment includes a casing 6 attached to the exhaust end portion 43 of the silencer 4 including the catalyst device 41, an exhaust flow control cylinder 7 concentrically attached in the casing 6 so as to form an annular space portion A between the exhaust flow control cylinder 7 and the inner surface of the casing 6, and a cooling cylinder 8 coaxial with the casing 6 and attached to an end portion of the casing 6 on the exhaust downstream side at an interval L3 with respect to the exhaust flow control cylinder 7 in an exhaust direction. The exhaust flow control cylinder 7 is formed from a ceramic material (this may be a stainless steel material, an aluminum material, or other metal or alloy).

The exhaust flow control cylinder 7 has a first expansion portion X having an approximate truncated cone cross section that gradually expands in diameter toward the downstream side of the exhaust flow, and an acceleration portion Y continuously provided with the first expansion portion X and having an approximate truncated cone cross section that gradually contracts in diameter toward the downstream side of the exhaust. In addition, diversion holes 9 through which the acceleration portion Y and the space portion A communicate are provided in a connecting portion of the acceleration portion Y to the first expansion portion X.

The space portion A is formed as a second expansion portion whose capacity gradually increases toward the downstream side of the exhaust, and has a throttle 10 at an end portion thereof on the downstream side of the exhaust. The throttle 10 faces an end portion of the acceleration portion Y on the downstream side of the exhaust.

The cooling cylinder 8 includes an inner cylinder 11 connected to the throttle and an outer cylinder 12 forming an annular ventilation space portion Z between the inner cylinder 11 and the outer cylinder 12. The outer cylinder 12 has a vent 13 for introducing outside air into the ventilation space portion Z.

In the present embodiment, an example of an exhaust promotion device suitable for being installed in a terminal of an exhaust system of an internal combustion engine mounted on a vehicle consisting of a large freight vehicle (truck) is illustrated, but the exhaust promotion device can also be applied to passenger cars and other vehicles by adopting a size and a structure according to the displacement of the internal combustion engine. Further, the exhaust promotion device 5 of the illustrated example is formed so as to have an elliptical cross section so as to be compatible with a vehicle having a low vehicle height. The ellipticity (major diameter/minor diameter) of the casing 6 is set to be about 1.4. This ellipticity can be changed in the range of 1.1 to 1.8. If the ellipticity is set to 1.8 or more, the ellipse becomes too flat, which makes it difficult to manufacture and may degrade the exhaust promotion function. Of course, depending on the vehicle to be equipped with the casing 6, a shape of or close to a perfect circle may be employed.

In the present embodiment, the casing 6 is formed from a stainless steel material (may be a ceramic material, an aluminum material, or other metal or alloy), and a fitting recess portion 6a in which the exhaust end portion 43 of the silencer 4 is fitted and fixed is formed at an end portion thereof on the upstream side in the exhaust direction.

Further, an annular connecting projection 14 to which the cooling cylinder 8 is fixed is formed at an end portion of the casing 6 on the downstream side in the exhaust direction.

The inner cylinder 11 constituting the cooling cylinder 8 is fitted and fixed inside the connecting projection 14, and the outer cylinder 12 is fitted and fixed to the outer periphery of the connecting projection 14.

Further, in the present embodiment, multiple spiral grooves 15 and 16 are formed in the inner surface (inner peripheral surface) of the exhaust flow control cylinder 7 and the inner cylinder 11. The spiral grooves 15 are formed in the entire inner surface of the exhaust flow control cylinder 7, and are formed in multiple rows so as to extend spirally from the upstream side to the downstream side in the exhaust direction. The spiral grooves 16 are formed in the entire inner surface of the inner cylinder 11, and are formed in multiple rows so as to extend spirally from the upstream side to the downstream side in the exhaust direction.

As illustrated in FIG. 2, the inner surface of the casing 6 is formed as a curved surface having a gentle curvature in the entire inner surface so that the flow of the exhaust flow (outer peripheral flow described later) becomes smooth. In the example illustrated in FIG. 2, whereas the casing 6 itself is formed in the shape of a cylinder having an elliptical cross section as a whole, both end portions thereof are formed in the shape of a loose spherical surface that is tapered.

That is, on the exhaust upstream side of the casing 6, an upstream spherical surface portion 62 that is expanded in diameter in an approximate spherical shape from an end portion thereof on the exhaust upstream side toward the exhaust downstream side is provided. In addition, on the exhaust downstream side of the casing 6, a downstream spherical surface portion 63 that is expanded in diameter in an approximate spherical shape from an end portion thereof on the exhaust downstream side toward the exhaust upstream side is provided. In an intermediate portion between the upstream spherical surface portion 62 and the downstream spherical surface portion 63, a cylindrical curved surface portion 64 which is a curved surface along the circumferential direction of the elliptical cross section is provided.

As a result, the inner surface of the casing 1 is formed in a gently curved surface having a cylindrical curved surface portion 64 formed on the inner surface linear in the exhaust direction continuous from the upstream spherical surface portion 62, and a downstream spherical surface portion 63 continuous from the cylindrical curved surface portion 64. Therefore, the outer peripheral flow flows smoothly along this gently curved surface.

Further, the end portion of the casing 6 on the exhaust upstream side is connected to the end portion of the first expansion portion X of the exhaust flow control cylinder 7 on the exhaust downstream side, and diversion holes 9 are arranged at the connection portion. In the illustrated example, the diversion holes 9 are provided at four locations at equal intervals in the circumferential direction of the exhaust flow control cylinder 7. Each diversion hole 9 is formed in a long elliptical shape along the exhaust direction. The size of each diversion hole 9 depends on the number of the diversion holes 9, the size of the exhaust flow control cylinder 7, the size of the space portion A, the diameter of a discharge port 71 of the acceleration portion Y, and so forth, and in the illustrated example, the size is set to be around ⅓ to ¼ of the length of the acceleration portion Y.

The diameter of the discharge port 71 is adjusted according to the displacement of the internal combustion engine. For example, in the case of a passenger car or a freight car with an internal combustion engine displacement of 5500 cc and one exhaust pipe, the diameter is set to 36 to 40φ, preferably 38φ. In the case of two exhaust pipes with the same displacement, the exhaust promotion device 5 including the discharge port 71 having a diameter of 25p is connected to each exhaust pipe, and a total of two units are used.

When the displacement of the internal combustion engine is 2500 cc and one exhaust pipe is used, the diameter is set to 26 to 28φ, preferably 27φ. In the case of two exhaust pipes with the same displacement, the exhaust promotion device 5 including the discharge port 71 having a diameter of 22φ is connected to each exhaust pipe, and a total of two units are used.

To be noted, the exhaust promotion device 5 in the present embodiment is designed such that a length L1 thereof from the upstream end portion of the exhaust flow control cylinder 7 to the throttle 10 portion of the casing 6 and a length L2 of the cooling cylinder 8 (substantial length of an exhaust path from the entrance of the throttle to the exit of the cooling cylinder 8) are approximately equal. If the length L2 is too small as compared with the length L1, the exhaust promotion effect may be lowered. This is because if the length L2 is small, the suction function due to the negative pressure generated near the throttle 10 may deteriorate. Also, if the length L2 is too large, the suction function may deteriorate.

Further, it is preferable that the throttle 10 is located on the exhaust downstream side with respect to the discharge port 71.

Further, a relative distance L3 between the discharge port 71 and the throttle 10 also affects the suction function derived from the negative pressure generated in the vicinity of the throttle 10.

That is, the relative distance L3 is set to a value that maximizes the suction function derived from the negative pressure. The exhaust flow accelerated and discharged from the discharge port 71 is set to about Mach 1.2 to 1.6, preferably Mach 1.4 to 1.6.

To be noted, in the example illustrated in FIG. 2, a maximum diameter portion 72 on the exhaust upstream side in the exhaust flow control cylinder 7 is preferably set to 2.5 times or more, more preferably 2.8 times or more, and particularly preferably 3.0 times or more, and preferably 7 times or less, more preferably 6 times or less, further preferably 5 times or less, particularly preferably 4 times or less, and yet particularly preferably 3.5 times or less of a minimum diameter portion 73 on the exhaust downstream side.

In addition, regarding the length of each part of the exhaust flow control cylinder 7, that is, an enlarged diameter portion 7a, a reduced diameter portion 7b, and a cylindrical portion 7c on the exhaust upstream side of the exhaust flow control cylinder 7 are preferably configured as (1), (2), and (3) below.

(1) The reduced diameter portion 7b is preferably set to 2 times or more, more preferably 3 times or more, further preferably 3.3 times or more, and particularly preferably 3.5 times or more, and preferably 6 times or less, more preferably 5 times or less, further preferably 4.5 times or less, and particularly preferably 4.4 times or less of the enlarged diameter portion 7a.

(2) The reduced diameter portion 7b is preferably set to 1.5 times or more, more preferably 1.7 times or more, further preferably 2 times or more, and particularly preferably 2.2 times or more, and preferably 3.2 times or less, more preferably 3 times or less, further preferably 2.8 times or less, and particularly preferably 2.6 times or less of the cylindrical portion 7c.

(3) The cylindrical portion 7c is preferably set to 0.8 times or more, more preferably 1 time or more, further preferably 1.3 times or more, and particularly preferably 1.5 times or more, and preferably 2.5 times or less, more preferably 2.1 times or less, and further preferably 1.9 times or less of the enlarged diameter portion 7a.

In addition, regarding the ratio between the maximum diameter of the casing 6 and the maximum diameter 72 of the acceleration portion Y of the exhaust flow control cylinder 7, the maximum diameter of the casing 6 is preferably set to 1.3 times or more, more preferably 1.4 times or more, and further preferably 1.5 times or more, and preferably 2 times or less of the maximum diameter 72 of the acceleration portion 7.

To be noted, in the example illustrated in FIG. 2, a plurality of recess portions 61 are provided in the inner wall of the casing 6. In addition to a silencing function, these plurality of recess portions 61 also exhibit a flow rate reducing function of slowing the flow of exhaust gas. When the emphasis is on facilitating the flow of the outer peripheral flow in the space portion A surrounded by the casing 6, a configuration in which the plurality of recess portions 61 are not be provided in the inner wall of the casing 6 may be employed.

Next, the exhaust promotion method and the exhaust system improvement method will be described together with the effect of the exhaust promotion device 5 configured in this way.

The exhaust gas that has flowed into the exhaust promotion device 5 expands in the first expansion portion X in the exhaust flow control cylinder, a part thereof becomes a central flow toward the acceleration portion Y, and the remainder is divided into the second expansion portion (space portion) A through the diversion holes 9 to become the outer peripheral flow.

The outer peripheral flow further expands in the second expansion portion A and then flows toward the throttle 10 on the downstream side, and the central flow is accelerated in the acceleration portion Y and then jetted toward the center of the throttle 10.

Here, a negative pressure region is formed around the throttle 10 by the central flow jetted from the acceleration portion Y to the throttle 10, and the outer peripheral flow in the second expansion portion A is sucked by this negative pressure and caused to flow into the inner cylinder 11 in the cooling cylinder 8 together with the central flow.

Meanwhile, in the cooling cylinder 8, outside air flows into the ventilation space portion Z as the vehicle travels, and this outside air flows in contact with the inner surface of the outer cylinder 12 and the outer surface of the inner cylinder 11.

In this way, the exhaust gas is discharged while being accelerated, is thus suppressed from becoming an exhaust resistance, and thereby the exhaust efficiency is improved.

Further, the outer peripheral flow continuously expands in the first expansion portion X and the second expansion portion A, and the temperature of the outer peripheral flow is reduced due to these expansions.

Then, the outer peripheral flow is further cooled by the outside air in the cooling cylinder 8, and thus the temperature is reduced.

Due to such reduction of the temperature of the outer peripheral flow, the thermal energy of the exhaust gas is deprived, and a behavior derived from the thermal energy is suppressed.

The flow direction of the exhaust gas whose behavior derived from the thermal energy is suppressed becomes easy to control, so that the flow of the exhaust gas is caused to follow the main exhaust direction and the exhaust becomes smooth.

By the synergistic action of smoothing the exhaustion and increasing the speed of the exhaustion by the cooling of the exhaust gas, the exhaust promotion method of the present invention can be effectively implemented and the exhaust efficiency can be further improved.

Further, the spiral grooves 15 formed in the inner wall of the exhaust flow control cylinder 7 make the central flow a swirling flow to improve the straightness thereof and increase the negative pressure generated at the throttle 10, and thus the effect of sucking the outer peripheral flow by this negative pressure is enhanced to assist the acceleration of the exhaust gas.

Further, the spiral grooves 16 formed in the inner wall of the inner cylinder 11 make the exhaust gas a spiral flow to further improve the straightness thereof and smooth the flow, and the exhaust efficiency can be improved from this point as well.

Further, the contact area between the exhaust gas and each of the casing 6, the exhaust flow control cylinder 7, and the inner cylinder 11 can be increased to enhance the cooling effect of the exhaust gas by the casing 6, the exhaust flow control cylinder 7, and the inner cylinder 11.

Further, as a result of forming the exhaust flow control cylinder 7 from a ceramic material, it is possible to purify the exhaust gas by utilizing the catalytic function of the ceramic material.

Further, by accelerating the exhaust flow in the central portion in this way, the temperature can be lowered to reduce NOx, and in the outer peripheral portion, the exhaust flow can be slowed to raise the temperature to reduce the PM of the exhaust gas. As a result, both NOx and PM can be reduced.

To be noted, the various shapes, dimensions, and the like of each component described in the first embodiment are examples, and can be changed in various ways based on design requirements and the like.

Second Embodiment

Next, regarding an exhaust system improvement method of an internal combustion engine, an example in which the present invention is applied to an automobile will be described.

The second embodiment is an invention relating to an exhaust system improvement method for an automobile 1 equipped with an internal combustion engine 2 provided with an exhaust system 40 (exhaust pipe 3, catalyst device 41, silencer 4) for purifying exhaust gas with a catalyst device 41. This exhaust system improvement method includes a step of providing an exhaust promotion device 5 at an exhaust end portion 43 of the exhaust system 40, and an engine driving step of driving the internal combustion engine 2, and in the engine driving step, the exhaust system 40 including the catalyst device 41 is cleaned by driving the internal combustion engine for a required time.

In this way, by providing the exhaust promotion device 5 at the exhaust end portion 43 of the exhaust system 40 and driving the internal combustion engine 2, the exhaust promotion device 5 exerts a strong exhaust promotion effect, and thus the exhaust system 40 including the catalyst device 41 can be cleaned. That is, when the operation of the internal combustion engine 2 is continued, carbon and other harmful substances contained in the exhaust gas gradually attach to the exhaust system 40 and the catalyst device 5, but by providing the exhaust promotion device 5 of the present invention at a predetermined position to strongly promote exhaustion, an effect of removing the attached carbon and other harmful substances by clean high-speed exhaust including negative pressure suction is exerted. This effect is more effective as the operating time of the internal combustion engine 2 is longer. Furthermore, this effect becomes more effective as the engine speed increases.

Further, after the exhaust system 40 including the catalyst device 41 is cleaned sufficiently, it is possible to suppress the attachment of carbon and other harmful substances to the exhaust system 40 including the catalyst device 41. This is because by the strong negative pressure suction effect using the negative pressure of the exhaust promotion device 5, exhaust gas that is completely combusted or nearly completely combusted is discharged from the combustion chamber of the internal combustion engine and flows through the exhaust system 40 and the catalyst device 41. This is also because at this time, due to the negative pressure suction effect, the air required for complete combustion is sufficiently supplied to the combustion chamber, and the exhaust gas in the combustion chamber is also sufficiently scavenged. Therefore, the cleaning effect of the exhaust system 40 including the catalyst device 41 can be maintained for a long period of time or until the internal combustion engine 2 is no longer used. Moreover, since the exhaust promotion device 5 does not have a mechanical moving part as illustrated, the exhaust promotion device 5 does not need to be replaced.

To be noted, in the engine driving step, it is preferable to drive the internal combustion engine 2 for 1 hour or more. Although it depends on the amount of carbon and other harmful substances attached to the exhaust system including the catalyst device 41, the engine driving step is preferably longer, more preferably 3 hours or more, and particularly preferably 5 hours or more. Although the cleaning function is exhibited even if the driving time of the internal combustion engine is shorter than 1 hour, the cleaning function becomes remarkable at or after 1 hour.

Further, in the engine driving step, it is preferable to use an in-use vehicle equipped with the internal combustion engine 2 including the exhaust system 40 including the catalyst device 41. This is because in the case of an in-use vehicle, the amount of carbon and other harmful substances attached to the exhaust system 40 including the catalyst device 41 is large. In such a specification process vehicle, it is preferable to perform the engine driving step for 5 hours or more. By doing so, it becomes possible to greatly reduce the amount of attached carbon and other harmful substances. This makes it possible to return the amount of attached carbon and other harmful substances to a state close to that of a new car. Of course, the exhaust gas including CO2, CO, HC, NOx, PM, etc. can be kept lower than that of a new car.

Further, it is preferable that the engine driving step includes a step of traveling or virtually travelling an in-use vehicle.

As described above, in the engine driving step of the in-use vehicle, it is preferable that the vehicle is actually driven or virtually driven on a rotating roller. This is because a more practical, more efficient, and more economical exhaust system improvement method can be achieved by using a traveling mode in which a load is actually applied to the rotation of the wheels than by using a mode in which the engine is driven but the vehicle is not driven.

Further, the engine driving step is preferably performed until the travel distance by the driving of the internal combustion engine 2 becomes 100 km or more.

Here, the travel distance by the driving of the internal combustion engine is set to 100 km or more in consideration of the in-use vehicle. This is because, in the case of an in-use vehicle, although it depends on the number of years of use and the travel distance so far, the test results are generally significantly improved at a travel distance of 100 km or more. Of course, the cleaning function can be expected even at 100 km or less, but it cannot be said that the function is fully exhibited. As the travel distance reached 200 km, 300 km, and 400 km, the cleaning action gradually progressed, and it was found that the cleaning action was still progressing when the distance exceeded 500 km. It was found that there were several vehicles whose fuel efficiency were improved by 50% or more among the in-use vehicles in which the engine driving step was performed beyond 500 km.

To be noted, as an example for reference, test results described below were obtained by a test run conducted by the applicant.

(1) The exhaust promotion device 5 was attached to the exhaust system end portion 43 of a 2000 cc LPG engine passenger car that had been used for 9 years, and the car was driven for 400 km or more in total (first travel distance: 137 km, second travel distance: 112 km, and third travel distance: 168 km). As a result, the fuel consumption of the first run improved to 24.5%, the fuel consumption of the second run improved to 22.4%, and the fuel consumption of the third run improved to 43.1%, respectively. The $CO_2$ reduction rate was 44.4% for the first time, 77.0% for the second time, and 78.8% for the third time.

(2) The exhaust promotion device 5 was attached to the exhaust system end portion 43 of a 650 cc gasoline engine passenger car that had been used for 5 years, and the car was driven for 500 km or more in total (first travel distance: 203 km, second travel distance: 254 km, and third travel distance: 114 km). As a result, the fuel consumption of the first run improved to 23%, the fuel consumption of the second run improved to 26.9%, and the fuel consumption of the third run improved to 48.7%, respectively. The $CO_2$ reduction rate was 65.2% for the first time, 66.9% for the second time, and 64.2% for the third time.

(3) The exhaust promotion device 5 was attached to the exhaust system end portion 43 of a 2000 cc LPG engine passenger car that had been used for 9 years, and the car was driven for 900 km or more in total (first travel distance: 409 km, second travel distance: 251 km, and third travel distance: 333 km). As a result, the fuel consumption of the first run improved to 19.2%, the fuel consumption of the second run improved to 40.3%, and the fuel consumption of the third run improved to 140.3%, respectively. The $CO_2$ reduction rate was 32.4% for the first time and 77.9% for the second time.

Considering this test result, it is confirmed that the longer the travel distance in which the exhaust promotion device 5 is attached is, the more the cleaning action of the exhaust system 40 including the catalyst device 41 progresses, and the exhaust pressure of the exhaust system 40 decreases accordingly, so that the exhaust promotion effect becomes more prominent.

To be noted, it is also characteristic that in the exhaust system improvement method for an internal combustion engine according to the present embodiment, the exhaust system 40 of the internal combustion engine 2 is provided with the exhaust promotion device 5 described above (described in claims 2 to 8) to impart the self-cleaning function to the exhaust system 4.

According to the present embodiment, it is possible to impart a self-cleaning function to the exhaust system 40 simply by providing the exhaust promotion device 5 described above in the exhaust system 40 of the internal combustion engine 2 in this way.

In addition, the present invention is also characterized by including the automobile 1 equipped with the internal combustion engine 2 including the exhaust promotion device 5 described above.

An automobile having such a function can exert the following extremely remarkable effects that are normally unpredictable.

Exhaust system cleaning function, fuel efficiency improvement function, output improvement function, engine and exhaust system cooling function, complete combustion function of fuel in the combustion chamber, $CO_2$ reduction function, harmful gas reduction function, graphite suppression function, exhaust gas deodorization, maintenance-free, no new energy required, engine speed reduced by 100 rpm or more when idling.

REFERENCE SIGNS LIST 1 vehicle
2 internal combustion engine
3 exhaust pipe
4 silencer
40 exhaust system
41 catalyst device
43 exhaust end portion
5 exhaust promotion device
6 casing
6a fitting recess portion
61 recess portion
62 upstream spherical surface
63 downstream spherical surface
64 cylindrical curved surface portion
7 exhaust flow control cylinder
71 discharge port
72 maximum diameter portion
73 minimum diameter portion
7a enlarged diameter portion
7b reduced diameter portion
7c cylindrical portion
8 cooling cylinder
9 diversion hole
10 throttle
11 inner cylinder
12 outer cylinder
13 vent
14 connecting projection
15 spiral groove
16 spiral groove
A space portion (second expansion portion)
X first expansion portion
Y acceleration portion
Z ventilation space portion

The invention claimed is:

1. An exhaust promotion device for an internal combustion engine for improving an exhaust efficiency of a combustion gas discharged from the internal combustion engine, the exhaust promotion device comprising:

a casing provided in an exhaust system of the internal combustion engine an exhaust flow control cylinder concentrically provided in the casing so as to form an annular space portion between an inner surface of the casing and the exhaust flow control cylinder; and a cooling cylinder coaxial with the casing and provided at an end portion of the casing on an exhaust downstream side at an interval with respect to the exhaust flow control cylinder in an exhaust direction, wherein the exhaust flow control cylinder has a first expansion portion having an approximate truncated cone cross section that gradually expands in diameter toward a downstream side of an exhaust flow, and an acceleration portion continuously provided with the first expansion portion and having an approximate truncated cone cross section that gradually contracts in diameter toward the downstream side of the exhaust flow, a diversion hole through which the acceleration portion and the annular space portion communicate is provided in a connecting portion of the acceleration portion to the first expansion portion, the annular space portion is a second expansion portion whose capacity gradually increases toward the downstream side of the exhaust flow, and has, at an end portion thereof on the downstream side of the exhaust flow, a throttle facing an end portion of the acceleration portion on the downstream side of the exhaust flow, and the capacity of the annular space portion is more than 1.8 times and less than 2.6 times a capacity of the acceleration portion, on the exhaust downstream side of the casing, a downstream spherical surface portion is provided with a spherically expanded diameter from an end of the exhaust downstream side toward an exhaust upstream side, and the downstream spherical surface portion is continuous with an inner surface of the throttle, the throttle is located downstream from a discharge port of the acceleration portion, and a distance between the throttle and the discharge port is set to a value that maximizes a suction function by negative pressure generated near the throttle.

2. The exhaust promotion device for an internal combustion engine according to claim 1, wherein multiple spiral grooves are formed in an inner wall of the exhaust flow control cylinder.

3. The exhaust promotion device for an internal combustion engine according to claim 1, wherein the cooling cylinder includes an inner cylinder connected to the throttle and an outer cylinder forming an annular ventilation space portion between the inner cylinder and the outer cylinder, and the outer cylinder has a vent for introducing outside air into the annular ventilation space portion.

4. The exhaust promotion device for an internal combustion engine according to claim 3, wherein multiple spiral grooves are formed in an inner wall of the inner cylinder.

5. The exhaust promotion device for an internal combustion engine according to claim 1, wherein at least one of the casing and the exhaust flow control cylinder is formed from a ceramic material.

6. The exhaust promotion device for an internal combustion engine according to claim 1, wherein a plurality of recess portions are formed in the inner surface of the casing.

7. A method comprising:
providing the exhaust promotion device of claim 1 at an exhaust end portion of the exhaust system; and
operating the internal combustion engine, wherein
the exhaust system includes a catalyst device that is cleaned by operating the internal combustion engine for a period of time.

8. The method of claim 7, wherein the period of time is one hour or more.

9. The method of claim 7, wherein the internal combustion engine is installed in a vehicle.

10. The method of claim 9, wherein operating the internal combustion engine comprises traveling or virtually travelling the vehicle.

11. The method of claim 9, comprising operating the internal combustion engine until a travel distance by the vehicle is 100 km or more.

12. The exhaust promotion device for an internal combustion engine according to claim 1, wherein the capacity of the annular space portion is more than 2.0 times and less than 2.3 times the capacity of the acceleration portion.

13. The exhaust promotion device for an internal combustion engine according to claim 12, the inner surface of the casing is formed as a curved surface over the entire inner surface.

14. The exhaust promotion device for an internal combustion engine according to claim 12, wherein the casing is formed in the shape of a cylinder having an elliptical cross section, and the casing having opposite end portions each of which are formed in the shape of a spherical surface that is tapered.

15. The exhaust promotion device for an internal combustion engine according to claim 1, wherein the inner surface of the casing is formed as a curved surface over the entire inner surface.

16. The exhaust promotion device for an internal combustion engine according to claim 1, wherein the casing is formed in the shape of a cylinder having an elliptical cross section, and the casing having opposite end portions each of which are formed in the shape of a spherical surface that is tapered.

* * * * *